US012461887B1

United States Patent
Yu et al.

(10) Patent No.: US 12,461,887 B1
(45) Date of Patent: Nov. 4, 2025

(54) PCIe RETIMER WITH REDUCED POWER LOW LATENCY MODE

(71) Applicant: Credo Technology Group Limited, George Town (KY)

(72) Inventors: Tao Yu, Milpitas, CA (US); Junqing Sun, Fremont, CA (US); Tianchen Luo, Milpitas, CA (US); Sanket Shah, Milpitas, CA (US); Don Barnetson, Campbell, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 18/812,627

(22) Filed: Aug. 22, 2024

(51) Int. Cl.
    *G06F 13/40*     (2006.01)
    *G06F 13/42*     (2006.01)

(52) U.S. Cl.
    CPC .. *G06F 13/4291* (2013.01); *G06F 2213/0026* (2013.01)

(58) Field of Classification Search
    None
    See application file for complete search history.

(56) References Cited

U.S. PATENT DOCUMENTS

| | | | | |
|---|---|---|---|---|
| 7,477,526 B1* | 1/2009 | Co | ............... | G11C 5/04 365/201 |
| 11,349,704 B2 | 5/2022 | Fang et al. | | |
| 2001/0005907 A1* | 6/2001 | Pekonen | .......... | H04N 21/26241 725/111 |
| 2005/0025110 A1* | 2/2005 | Becker | ................ | H04B 1/712 370/332 |
| 2005/0025225 A1* | 2/2005 | Niederholz | .......... | H04B 1/7115 375/E1.032 |
| 2009/0232495 A1* | 9/2009 | Shi | ................... | H04Q 11/0067 398/43 |
| 2009/0296865 A1* | 12/2009 | Ashikhmin | ............... | H04L 5/14 375/358 |
| 2017/0230078 A1* | 8/2017 | Sun | .................... | H04M 11/062 |

(Continued)

OTHER PUBLICATIONS

PCI Express® Base Specification Revision 6.1, Jul. 2023.

(Continued)

*Primary Examiner* — Hyun Nam
(74) *Attorney, Agent, or Firm* — RAMEY LLP; Daniel J. Krueger (57) ABSTRACT

An illustrative retimer includes: an upstream interface having an upstream receiver configured to convert a downlink signal into a downlink symbol stream; a downstream interface having a downstream transmitter configured to provide a transmit signal representing the downlink symbol stream; core circuitry having a downstream path and a downstream bypass path; and a controller. The downstream path is configured to convey the downlink symbol stream from the upstream receiver to the downstream transmitter via a receive clock domain component, a core clock domain component, and a transmit clock domain component. The downstream bypass path is configurable to convey the downlink symbol stream from the upstream receiver to the downstream transmitter without any core clock domain components. The controller is configured to disable a clock signal for the transmit clock domain component of the downstream path when the downstream bypass path is enabled.

20 Claims, 3 Drawing Sheets

(56) References Cited

U.S. PATENT DOCUMENTS

2019/0050365 A1* 2/2019 Kopzon ............. G06F 13/4282
2019/0095380 A1* 3/2019 Das Sharma ....... G06F 13/4282
2021/0049055 A1* 2/2021 Stewart ............. G06F 11/1423

OTHER PUBLICATIONS

Sharma, "PCI Express 6.0 Specification: A Low-Latency, High-Bandwidth, High-Reliability, and Cost-Effective Interconnect With 64.0 GT/s PAM-4 Signaling", Intel Corporation, Santa Clara, CA, Jan. 2021.

U.S. Appl. No. 18/387,731 as filed in U.S. Patent and Trademark Office on Nov. 7, 2023 by inventors Kyungjin Kim, Wenzhe Gao, Alex Nazari, Chad Cohen and Xin Chang, titled: "Serdes With Robust Parameter Initialization".

U.S. Appl. No. 18/596,953 as filed in U.S. Patent and Trademark Office on Mar. 6, 2024 by inventors Kyungjin Kim, Haihui Luo, Shunken Huang and Junqing Sun, titled: "Adaptive Comparator Calibration".

* cited by examiner

PCIe RETIMER WITH REDUCED POWER LOW LATENCY MODE

BACKGROUND

The Peripheral Component Interconnect Express ("PCIe") Specification is one of a variety of standards for general purpose input/output interconnects. Such interconnects are frequently used for expansion buses that can accept expansion cards or other interchangeable components for augmenting the resources and capabilities of computers and other electronic systems. The PCI Special Interest Group is an industry consortium that regularly updates the PCIe Specification every few years to double the data rate while maintaining backward compatibility inasmuch as possible. The PCIe 7.0 Specification, which is to be finalized in 2025, will support $8 \times 10^9$ PAM4 symbols per second per lane, for a net raw symbol rate of 128 GT/s in each direction over a 16-lane configuration. The net bit rate for a 16 lane PCIe link will be up to 242 Gbps. Such bitrates make PCIe attractive for systems designed to implement machine learning, artificial intelligence, real time image processing, gaming, high bandwidth data storage, and even computer center networking.

With its origins as a parallel bus, PCIe imposes strict limitations on latency to facilitate the use of a load-store interconnect protocol. This latency limitation necessarily limits the reach of a given PCIe link particularly at high symbol rates where noise or other signal integrity issues may necessitate relatively frequent retransmissions. Retimers may combat such signal integrity issues and (despite increasing the minimum latency) may improve consistency and substantially reduce the average transaction latency.

Depending on the signal integrity issues presented in a given link, it may be possible to bypass certain functions of the retimer and thereby reduce latency associated with the retimer. As one example, PCIe retimers may operate to remove skew between lanes of the link, thereby improving alignment between symbol streams arriving at the endpoints of the link. This deskew operation requires some form of symbol stream buffering, necessarily introducing latency. If it is determined that the lane skew is negligible or at least within an acceptable tolerance, this function may be bypassed to avoid the associated buffering latency. To that end, some retimers may support a "low latency" mode which the Root Complex can invoke to bypass at least the deskew function. Such retimers may be expected to exit the low latency mode at a moment's notice. This state of readiness in a low latency mode may be associated with an undesirable level of power consumption comparable to that of the retimer's normal mode of operation.

SUMMARY

Accordingly, there are disclosed herein methods of reducing power consumption in a retimer's low latency mode and retimers suitable for using such methods. One illustrative retimer includes: an upstream interface having an upstream receiver configured to convert a downlink signal into a downlink symbol stream; a downstream interface having a downstream transmitter configured to provide a transmit signal representing the downlink symbol stream; core circuitry having a downstream path and a downstream bypass path; and a controller. The downstream path is configured to convey the downlink symbol stream from the upstream receiver to the downstream transmitter via a receive clock domain component, a core clock domain component, and a transmit clock domain component. The downstream bypass path is configurable to convey the downlink symbol stream from the upstream receiver to the downstream transmitter without any core clock domain components. The controller is configured to disable a clock signal for the transmit clock domain component of the downstream path when the downstream bypass path is enabled.

An illustrative method of reducing power consumption of a retimer in a low latency mode includes: converting a downlink signal into a downlink symbol stream using an upstream receiver; providing a transmit signal representing the downlink symbol stream using a downstream transmitter; conveying the downlink symbol stream from the upstream receiver to the downstream transmitter using a downstream path having a receive clock domain component, a core clock domain component, and a transmit clock domain component; enabling a downstream bypass path from the upstream receiver to the downstream transmitter in response to an ordered set for enabling low latency mode, the downstream bypass path operating without any clock domain components; disabling a clock signal for the transmit clock domain component of the downstream path after enabling the downstream bypass path.

The foregoing retimer and method can be embodied as a semiconductor intellectual property core to generate retimer circuitry for carrying out the method.

Each of the foregoing may be implemented individually or conjointly, together with any one or more of the following features in any suitable combination: 1. the transmit clock domain component is one of a scrambler and a transmit buffer. 2. the core clock domain component is one of a lane deskew module, an ordered set decoder, and an ordered set modifier. 3. the receive clock domain component is one of a descrambler and a receive buffer. 4. the downstream path comprises multiple lanes and the controller is configured to disable a clock signal for all but one of the lanes in the core clock domain component when the downstream bypass path is enabled. 5. the controller is further configured to disable a clock signal for the core clock domain component of the downstream path when the downstream bypass path is enabled. 6. the controller is further configured to disable a clock signal for the receive clock domain component of the downstream path when the downstream bypass path is enabled. 7. a correlation module coupled to the downstream bypass path and configured to detect an ordered set for re-enabling the downstream path. 8. the retimer further comprises a management interface configured to receive a command for re-enabling the downstream path. 9. the downstream interface has a downstream receiver configured to convert a receive signal into the uplink symbol stream. 10. the upstream interface has an upstream transmitter configured to provide an uplink signal representing an uplink symbol stream. 11. the core circuitry has an upstream path configured to convey the uplink symbol stream from the downstream receiver to the upstream transmitter, the upstream path having a receive clock domain component, a core clock domain component, and a transmit clock domain component; and an upstream bypass path configurable to convey the downlink symbol stream from the downstream receiver to the upstream transmitter without any core clock domain components. 12. the controller is configured to disable the core clock domain component of the upstream path when the upstream bypass path is disabled.

DETAILED DESCRIPTION

Note that the specific embodiments given in the drawings and following description do not limit the disclosure. On the contrary, they provide the foundation for one of ordinary skill to discern the alternative forms, equivalents, and modifications that are encompassed in the claim scope.

Figure 1:
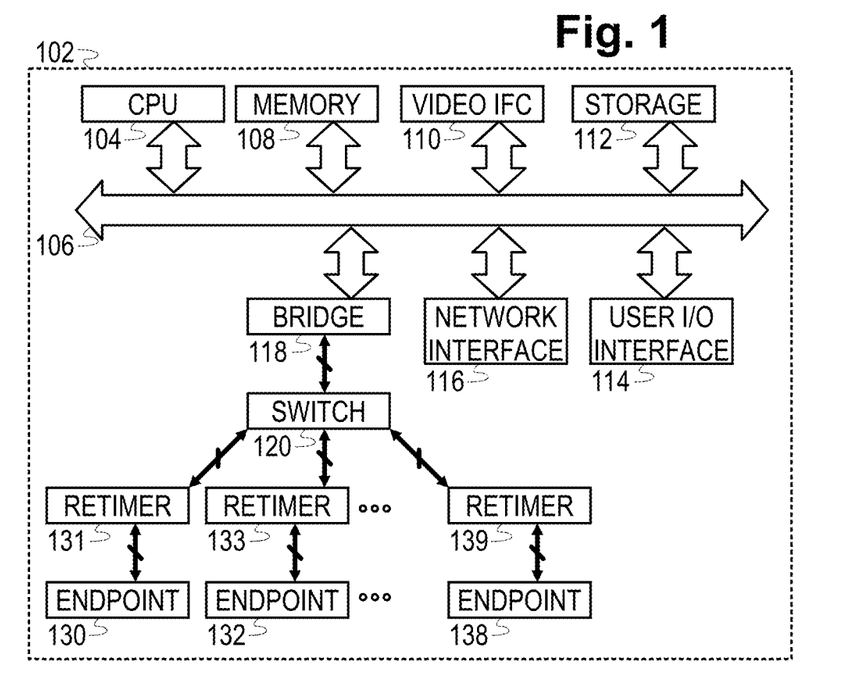
FIG. 1 shows an illustrative computer.

The disclosed retimers and power reduced low latency methods are best understood in an illustrative context. Accordingly, FIG. 1 shows an illustrative computer system 102 having a central processing unit 104 coupled via a system bus 106 to other components such as a system memory 108, a video display interface 110, a nonvolatile information storage device 112, a user input/output interface 114, a network interface 116, and an expansion bus bridge 118. Computer system 102 may represent a server, workstation, desktop computer, laptop computer, or indeed any form of expandable computer equipment. System memory 108 and/or information storage device 112 provides software to the central processing unit 104, configuring the computer system 102 to interact with users and/or to implement a desired function. As one example, computer system 102 may act as a high bandwidth network accessible storage device. As another example, computer system 102 may interact with other computer systems as part of a computer cluster that implements machine learning, artificial intelligence, real time image processing, gaming, numerical simulation, or another type of highly parallel processing task.

To such ends, computer system 102 may control a set of high bandwidth resources via one or more expansion bus bridges 118. In at least some contemplated embodiments, the bridge(s) 118 acts as part of a PCIe Root Complex providing access to a set of PCIe endpoints 130, 132, 138, via a switch 120. To enable a greater range between the switch and endpoints, each endpoint 130, 132, 138, may be coupled to the switch 120 via a respective retimer 131, 133, 139. As described further herein, the retimers may be configured to implement a reduced power low latency mode.

Figure 2:
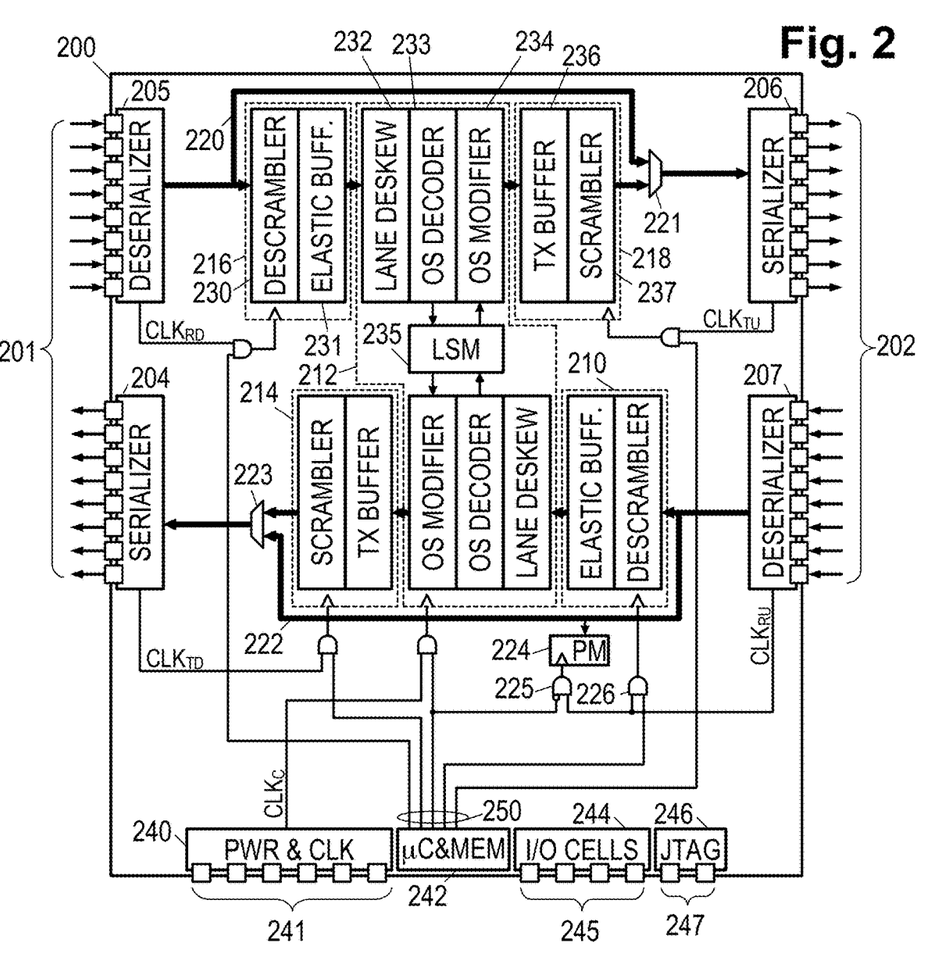
FIG. 2 is a block diagram of an illustrative retimer.

FIG. 2 shows an illustrative monolithic transceiver chip 200. Chip 200 includes serializer modules 204 and deserializer modules 205 with contacts 201 for sending and receiving high-rate symbol streams in each of eight lanes of a downstream link (e.g., to endpoint 130), additional serializer modules 206 and deserializer modules 207 with contacts 202 for conveying the high-rate symbol streams to and from an upstream link (e.g., to switch 120), and core logic 210-237 for implementing a channel communications protocol while conveying symbol streams between the upstream and downstream links. Also included are various supporting modules such as a power and clock module 240 with contacts 241, controller module 242, digital input/output module 244 with contacts 245 for control signals, and a JTAG module 246 with contacts 247 for built-in self testing. Though eight lanes are shown here, the actual number of lanes may vary as provided by the relevant standard.

The deserializer modules 205, 207 implement the receiving function of the chip 200, implementing decision feedback equalization ("DFE") or any other suitable equalization technique including those that employ a discrete-time finite impulse response ("FIR") filter with adjustable tap coefficients, e.g., linear equalization, partial response equalization. Deserializer module 205 converts the uplink signals into a parallelized uplink symbol stream and similarly deserializer module 207 converts the downlink signals into a parallelized downlink symbol stream. The core logic includes components 230-237 for an upstream path to couple the uplink symbol stream from deserializer 205 to serializer 206 and includes corresponding components for a downstream path to couple the downlink symbol stream to serializer 204. Serializers 204, 206 implement the transmitting function of the chip 200 with optional pre-equalization to combat signal attenuation. Serializer 204 incorporates transmitters to provide transmit signals that represent the downlink symbol stream, and serializer 206 similarly incorporates transmitters to provide transmit signals that represent the uplink symbol stream. Serializer 204 and deserializer 205 may collectively form the downstream interface, while serializer 206 and 207 may collectively form the upstream interface of the retimer chip 200.

As part of the receive process, the deserializer modules 205, 207 derive a symbol clock from the uplink and downlink signals. (A symbol clock is derived for each lane, but for the sake of clarity only a single symbol clock from each deserializer module is shown and described in FIG. 2.) Deserializer 205 recovers a downstream interface receive clock signal $CLK_{RD}$ from the uplink signals and deserializer 207 recovers an upstream interface receive clock signal $CLK_{RU}$ from the downlink signals. As part of the transmit process, the serializer modules 204, 206 generate a symbol clock for the transmit signals. Serializer module 204 generates a downstream interface transmit clock signal $CLK_{TD}$ and serializer module 206 generates an upstream interface transmit clock $CLK_{TU}$. The downstream and upstream paths may accordingly include components operating in multiple clock domains. The downstream path may include one or more components operating in a receive clock domain 210 driven by the upstream interface receive clock signal(s) $CLK_{RU}$, one or more components operating in a core clock domain 212 driven by a core clock signal $CLK_C$ supplied by the power and clock module 241, and one or more components operating in a transmit clock domain 214 driven by the downstream interface transmit clock signal $CLK_{TD}$. The upstream path may similarly include a component operating in a receive clock domain 216 driven by the downstream interface receive clock signal $CLK_{RD}$, a component operating in the core clock domain 212, and a component operating in a transmit clock domain 218 driven by the upstream interface transmit clock signal $CLK_{TU}$.

Examples of components that may operate in the receive clock domain 216 include a descrambler 230 that applies a predetermined exclusive-OR mask to the uplink symbol stream to recover the unscrambled symbol stream. (Such a reversible masking operation may improve performance by flattening the spectrum of the symbol stream that traverses the channel.) Another illustrative component is an elastic buffer 231 that allows for drift between clock frequencies in the different domains.

Examples of components that may operate in the core clock domain 212 include a lane deskewer 232 that reduces or eliminates skew between lanes of the uplink symbol stream. Other illustrative components include an ordered set (OS) decoder 233 and an ordered set modifier 234. The OS decoder 233 extracts and decodes commands and control parameters contained in fields between data frames. A link state machine (LSM) module 235 accepts commands from the OS decoders in the upstream and downstream paths and if needed invokes the appropriate OS modifier 234 to respond or to update the ordered set before forwarding.

Examples of components that may operate in the transmit clock domain 218 include a transmit buffer 236 to facilitate the transition between clock domains, As another example, a scrambler module 237 may apply a predetermined exclusive-OR mask to flatten the spectral content of the data frames in the symbol stream.

While the above-described core components are available for enhancing link performance, some links may not require them. Such may be the case, for example, when the upstream and downstream clock signals are tightly aligned. For such situations, the retimer's core circuitry provide an upstream bypass path 220 and a multiplexer 221 that selects between the upstream path and the upstream bypass path for conveying the uplink symbol stream to serializer 206. A downstream bypass path 222 may similarly be provided with a multiplexer 223 that selects between the downstream path and the downstream bypass path for conveying the downlink symbol stream to serializer 204. These bypass paths may eliminate the latency associated with the upstream and downstream path components and can be invoked with an ordered set in the downlink symbol stream providing a vendor-defined command causing the LSM module 235 to enable or disable the bypass paths to selectably provide a low-latency mode of operation.

Power and clock module 240 regulates and distributes power to the other components of chip 200 and generates a core clock signal $CLK_C$ or alternatively derives it from a reference clock signal received via contacts 241. The power and clock module 240 distributes the core clock signal to at least core clock domain 212 and may further distribute the core clock signal as a reference clock for other components of the chip 200.

Controller module 242 may include a programmable microcontroller and a nonvolatile memory having firmware to configure the operation of the programmable microcontroller. The controller module 242 may configure and coordinate the operations of the other components, particularly where their operations are subject to configuration parameters that are initialized during a bootup or reset process. Among other things, the controller module 242 may provide a set of clock enable signals 250. Each clock enable signal is coupled to a gate to block an associated clock signal when de-asserted and to pass the associated clock signal when asserted.

Digital I/O module 244 may implement a management bus interface, enabling the operation of control module and thus the chip as a whole to be monitored and modified. The digital I/O module 244 may support one or more suitable management bus protocols such as $I^2C$, MDIO, SPI, enabling an external host to read from and write to configuration registers in the controller module 242. Digital I/O module 244 may further support input of an enable signal, and output of one or more of a fault, status, error, or interrupt signal. JTAG module 246 may be reserved for use by automated test equipment in accordance with the JTAG specification for built-in self-testing.

We note here that when the bypass paths are enabled, there is an opportunity to reduce power consumption by disabling unused components in the upstream and downstream paths. Accordingly, the controller module 242 supplies clock enable signals enabling the controller to selectively enable and disable components of the upstream and downstream paths when the LSM module 235 indicates that it is appropriate. Such clock enable signals may alternative be generated directly by the LSM module 235.

In a first contemplated embodiment, the LSM module 235 and/or controller module 242 disables the transmit clock domain clock signals $CLK_{TU}$ and $CLK_{TD}$ when (or shortly after) entering the low-latency mode by enabling the bypass paths. The receive clock domain clock signals $CLK_{RU}$ and $CLK_{RD}$ as well as the core clock signal $CLK_C$ may remain enabled. The continued operation of the associated receive clock domain can core clock domain components enables the LSM module 235 to monitor the ordered sets in the uplink and downlink symbol streams for a command to exit the low-latency mode. When such an exit command is received, the LSM module 235 and/or the controller module 242 re-enables the transmit domain clock signals $CLK_{TU}$ and $CLK_{TD}$ and causes the multiplexers 221, 223 to de-select the bypass paths and re-select the upstream and downstream paths, respectively.

In a first variation of the first contemplated embodiment, components may be re-ordered to advance the OS decoder 233, e.g., placing it before the lane deskew module 232. The clock signals may be disabled for any components that come after the decoder 233 in each of the upstream and downstream paths until such time as a low latency mode exit command is detected.

In a second variation of the first contemplated embodiment, it is assumed that any command to exit the low-latency mode will be received from the upstream interface. In this case, LSM module and/or controller module may, in addition to disabling the transmit domain clock signals $CLK_{TU}$ and $CLK_{TD}$, may further disable the clocks to the other upstream path components 230-234, 236-237. In the case where a single downstream symbol stream lane is sufficient for receiving the exit command, the clock signals may be disabled for all but one of the downstream symbol lanes, greatly reducing power consumption.

In a second contemplated embodiment, the controller module 242 de-asserts all the clock enable signals 250 after the bypass paths are enabled. This situation minimizes power consumption in the low latency mode but may prevent the LSM module 235 from monitoring the symbol streams for an exit command.

Optionally (in this and other contemplated embodiments), the low-latency mode exit can be forced with a reset of the chip 200 or by providing an appropriate value to a controller configuration register via the management bus.

In a variation of the second contemplated embodiment, the disabling of all clock enable signals causes a gate 225 to pass the upstream interface receive clock signal $CLK_{RU}$ to a pattern matching filter 224 (aka correlation module), enabling the filter to monitor the downstream symbol stream for the pattern that indicates an exit command from the low latency mode. (The order sets are not scrambled and accordingly the pattern detection does not require a descrambling operation.) As before, a gate 226 blocks the upstream interface receive clock signal $CLK_{RU}$ from the receive clock domain 210 of the downstream path. It may be sufficient for the pattern matching filter 224 to operate on a single lane of the downstream symbol stream. Upon detecting the exit command, the filter 224 may cause the controller module 242 to assert all the clock enable signals and switch the multiplexers 221, 223 from the bypass paths to the original upstream and downstream paths.

Figure 3:
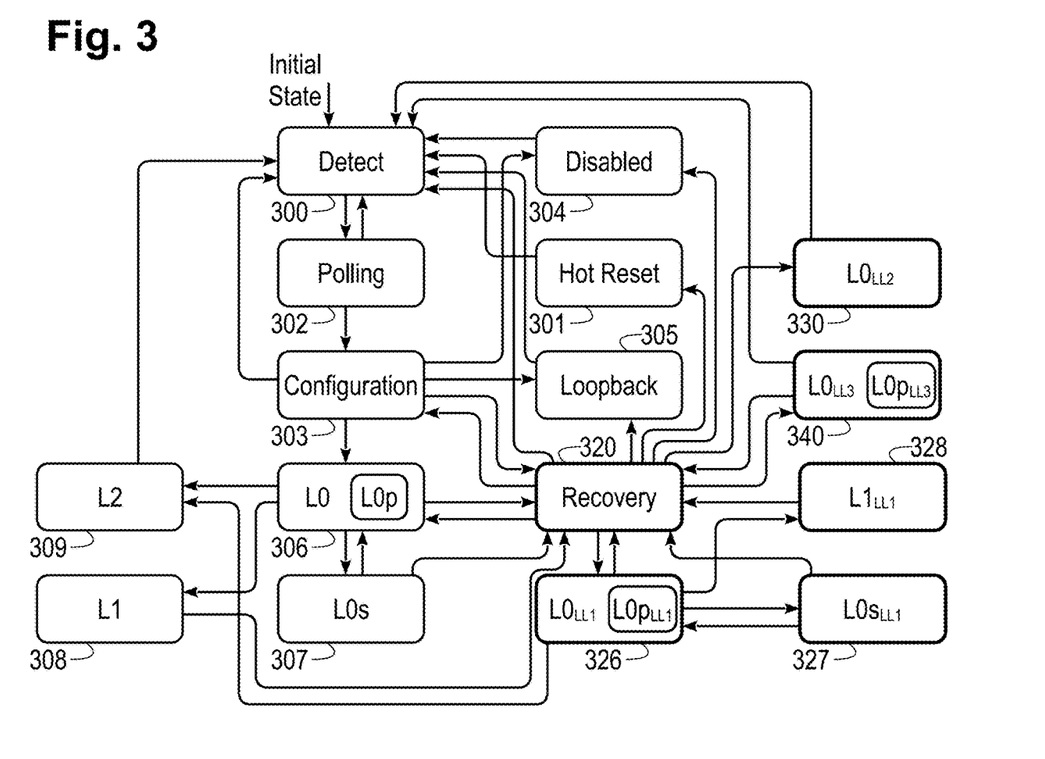
FIG. 3 is a state transition diagram of an illustrative link training state machine.

FIG. 3 is a state transition diagram of an illustrative link training state machine. States 300-309 correspond to the link training and status state machine (LTSSM) states shown and described in Section 4.2 of the PCI Express Base Specification Revision 6.1. The referenced specification is hereby incorporated herein by reference in its entirety. State 320 is modified and states 326-328 are added for the first contemplated embodiment. State 330 is added for the second contemplated embodiment. State 340 is added for the variation of the second contemplated embodiment. The LSM module may implement the state machine independently for the upstream link and for the downstream link.

State 300 is the state in which the LSM module initially starts and may return to in the event of a reset or link failure. State 300 represents a detection state used by the LSM module to detect when the upstream link and downstream link lanes are each terminated at the far end, i.e., each connected to port that can send signals to at least one lane of the repeater's upstream interface and to at least one lane of the repeater's downstream interface. Lack of such terminations may be apparent as a high impedance on the output signal conductors.

State 301 is a Hot Reset state which the LSM module enters if triggered to do so by the controller module or if the OS decoder indicates a hot reset command has been received. After a 2 ms timeout, the LSM module enters the Detect state 300.

State 302 is a Polling state which the LSM module enters from state 300 after determining which lanes are terminated. In the Polling state, the upstream and downstream interfaces transmit training ordered sets and respond to the training ordered sets they receive. The receivers achieve lock (clock synchronization) with the symbols and blocks conveyed by the uplink and downlink signals, adjusting lane polarity and adapting equalizer settings if needed. The interfaces exchange capability information to negotiate a data rate. If enough training ordered sets are exchanged before time out, the LSM module transitions to state 303. Otherwise, it returns to state 300.

State 303 is a configuration state that implements a negotiation sequence to determine the lane width of the link and the numbering of the lanes. If a link is disabled by the controller or command OS, the LSM module transitions to state 304. If the controller or an ordered set command places the link into loopback mode, the LSM module transitions to state 305. If the negotiation sequence completes before time out, the LSM module transitions to state 306. Otherwise, the LSM module transitions to state 320.

State 304 is a Disabled state during which the interfaces maintain the link in an Electrical Idle mode. The LSM transitions from this state to state 300 when an electrical idle exit command is detected.

State 305 is a loopback test mode which the controller may use to perform link testing. During the loopback test mode, the interface that initiates the loopback request is the lead, transmitting symbol patterns that will be echoed back by the remote end. When the LSM module exits this state, it returns to detect state 300.

State 306 is known as the L0 state which represents the state of normal operation for the link to transmit and receive data and control packets. The LSM module may exit the L0 state when an event occurs, or a command OS is detected. The L0 state may have a substate L0$p$ in which some lanes of the link are placed into idle mode while the rest remain active. The L0$p$ is intended as a first power savings state. The LSM module transitions from the L0 state to the Recovery state 320 when a transition is encountered, e.g., a request to use a different data rate or to switch to a low-latency mode.

State 307 is a power savings state L0$s$ entered from state 306 when the LSM module detects an Electrical Idle ordered set. The lanes are maintained in the electrical idle condition until an electrical idle exit command is detected. The LSM module exchanges a fast-training sequence across the link to re-establish synchronization before returning to block 306. If the fast-training sequence does not complete successfully, the LSM module transitions to recovery state 320.

State 308 is a power savings state L1 that offers greater power savings at the cost of additional resume latency. It may be selected by the controller or by a command ordered set as an alternative to the L0$s$ state. Upon exiting this state, the LSM module transitions to recovery state 320.

State 309 is a power savings state L2 in which most of the interface is powered down to aggressively conserve power. When power is restored or a wakeup event is otherwise detected, the LSM module transitions to detect state 300.

In recovery state 320, the LSM module confirms or re-establishes synchronization and may optionally update equalization settings and may renegotiate the data rate before optionally returning to state 306. The LSM can also reach other states from here if prompted by the controller or a command OS. For example, the controller may initiate a transition to the loopback state 305, to the hot reset state 301, or to the disabled state 304.

Recovery state 320 may be augmented to facilitate transitions to low latency states. If a command OS to enter a low latency state is detected in state 306, the LSM may transition to recovery state 320 before enabling the upstream and downstream bypass paths. In this mode, no data symbols will be in transition during the switch, and symbol stream synchronization lock can be re-established, and renegotiations of data rate and equalization settings may be performed before exiting the recovery state 320.

States 326-328 may be employed for the first contemplated embodiment of the reduced-power low-latency mode (LL1). State 326 is a normal operations mode L0$_{LL1}$ for the low latency state with the bypass paths enabled. Clocks for selected components of the upstream and downstream paths may be disabled as discussed previously. The LSM module continues to monitor ordered sets and can transition to the substate L0$p_{LL1}$ where some of the lanes are placed into idle mode while the rest remain active.

State 327 is a state analogous to power savings state 307 but with the bypass paths enabled. The lanes are maintained in an electrical idle condition until an exit is initiated as previously discussed in connection with state 307. From state 327, the LSM module may return to state 326 or recovery state 320.

State 328 is a state analogous to power savings state 308 but with the bypass paths enabled. When an exit is initiated the LSM module returns to recovery state 320.

As the analog for state 309 is equivalent to state 309, the LSM module can transition to state 309 from state 326. All paths including the bypass paths are powered off to aggressively conserve power.

State 330 may be employed for the second contemplated embodiment of the reduced-power low-latency mode (LL2). It is a normal operations mode L0$_{LL2}$ for the low latency state with the bypass paths enabled. Clocks are disabled for the upstream path and downstream path components, making the LSM module unable to monitor ordered sets. An exit from this state occurs via a reset of the retimer chip 200 or a sideband communication e.g., via the management bus.

State 340 may be employed for the variation of the second contemplated embodiment of the reduced-power low latency mode (LL3). It is a normal operations mode L0$_{LL3}$ for the low latency state with the bypass paths enabled. Clocks are disabled for the upstream path and downstream path components, but the pattern matching filter enables monitoring for select OS pattern which may cause the LSM module to return to recovery state 320. The LSM may also support a substate $L0p_{LL3}$ where some of the lanes are placed into idle mode, but in at least some embodiments this transition would occur via the Recovery state 320.

Retimers and other interfaces that would employ serializer and deserializer modules have become so complex that it is impractical for electronic device designers to design them from scratch. Instead, electronic device designers rely on predefined modular units of integrated circuit layout designs, arranging and joining them as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("intellectual property (IP) core", "soft macro") but are frequently employed interchangeably.

The modular units can be expressed in different ways, e.g., in the form of a hardware description language (HDL) file, or as a fully routed design that could be directly printed to create a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description. In any case, such semiconductor IP cores may be kept in a design database which resides on a nontransient information storage medium, e.g., a hard disk, flash drive, or any of the known hardware implementations for cloud-based abstractions of nonvolatile information storage. Once the device has been fully designed, commercially available software may convert the semiconductor intellectual property cores and other integrated circuit components into semiconductor mask patterns also stored on a nontransient information storage medium. Thereafter, the patterns may be conveyed to the various process units in a suitable assembly line of an integrated circuit manufactory.

Numerous alternative forms, equivalents, and modifications will become apparent to those skilled in the art once the above disclosure is fully appreciated. The order of modules and operations described in the upstream and downstream paths can be varied, with certain operations being reordered, pipelined and/or performed in parallel. It is intended that the claims be interpreted to embrace all such alternative forms, equivalents, and modifications where applicable.

What is claimed is:

1. A retimer comprising:
   an upstream interface having an upstream receiver configured to convert a downlink signal into a downlink symbol stream;
   a downstream interface having a downstream transmitter configured to provide a transmit signal representing the downlink symbol stream;
   core circuitry having:
     a downstream path configured to convey the downlink symbol stream from the upstream receiver to the downstream transmitter, the downstream path having a receive clock domain component, a core clock domain component, and a transmit clock domain component; and
     a downstream bypass path configurable to convey the downlink symbol stream from the upstream receiver to the downstream transmitter without any core clock domain components; and
   a controller configured to disable a clock signal for the transmit clock domain component of the downstream path when the downstream bypass path is enabled.

2. The retimer of claim 1, wherein the transmit clock domain component is one of a scrambler and a transmit buffer.

3. The retimer of claim 1, wherein the controller is further configured to disable a clock signal for the core clock domain component of the downstream path when the downstream bypass path is enabled.

4. The retimer of claim 3, wherein the core clock domain component is one of a lane deskew module, an ordered set decoder, and an ordered set modifier.

5. The retimer of claim 3, wherein the controller is further configured to disable a clock signal for the receive clock domain component of the downstream path when the downstream bypass path is enabled.

6. The retimer of claim 5, wherein the receive clock domain component is one of a descrambler and a receive buffer.

7. The retimer of claim 1, wherein the downstream path comprises multiple lanes and wherein the controller is configured to disable a clock signal for all but one of the lanes in the core clock domain component when the downstream bypass path is enabled.

8. The retimer of claim 1, further comprising a correlation module coupled to the downstream bypass path and configured to detect an ordered set for re-enabling the downstream path.

9. The retimer of claim 1, wherein the retimer further comprises a management interface configured to receive a command for re-enabling the downstream path.

10. The retimer of claim 1,
   wherein the downstream interface has a downstream receiver configured to convert a receive signal into an uplink symbol stream,
   wherein the upstream interface has an upstream transmitter configured to provide an uplink signal representing an uplink symbol stream,
   wherein the core circuitry has:
     an upstream path configured to convey the uplink symbol stream from the downstream receiver to the upstream transmitter, the upstream path having a receive clock domain component, a core clock domain component, and a transmit clock domain component; and an upstream bypass path configurable to convey the downlink symbol stream from the downstream receiver to the upstream transmitter without any core clock domain components, and wherein the controller is configured to disable the core clock domain component of the upstream path when the upstream bypass path is disabled.

11. A method of reducing power consumption of a retimer in a low latency mode, the method comprising:

converting a downlink signal into a downlink symbol stream using an upstream receiver;

providing a transmit signal representing the downlink symbol stream using a downstream transmitter;

conveying the downlink symbol stream from the upstream receiver to the downstream transmitter using a downstream path having a receive clock domain component, a core clock domain component, and a transmit clock domain component;

enabling a downstream bypass path from the upstream receiver to the downstream transmitter in response to an ordered set for enabling low latency mode, the downstream bypass path operating without any clock domain components; and disabling a clock signal for the transmit clock domain component of the downstream path after enabling the downstream bypass path.

12. The method of claim 11, wherein the transmit clock domain component is one of a scrambler and a transmit buffer.

13. The method of claim 11, further comprising disabling a clock signal for the core clock domain component of the downstream path after enabling the downstream bypass path.

14. The method of claim 13, wherein the core clock domain component is one of a lane deskew module, an ordered set decoder, and an ordered set modifier.

15. The method of claim 13, further comprising disabling a clock signal for the receive clock domain component of the downstream path after enabling the downstream bypass path.

16. The method of claim 15, wherein the receive clock domain component is one of a descrambler and a receive buffer.

17. The method of claim 11, wherein the downstream path comprises multiple lanes and wherein the method further comprises disabling a clock signal for all but one of the lanes in the core clock domain component after enabling the downstream bypass path.

18. The method of claim 11, further comprising monitoring the downlink symbol stream with a correlation module coupled to the downstream bypass path, the correlation module being configured to detect an ordered set for re-enabling the downstream path.

19. A nontransient information storage medium having a semiconductor intellectual property core to generate retimer circuitry comprising:

an upstream interface having an upstream receiver configured to convert a downlink signal into a downlink symbol stream;

a downstream interface having a downstream transmitter configured to provide a transmit signal representing the downlink symbol stream;

core circuitry having:

a downstream path configured to convey the downlink symbol stream from the upstream receiver to the downstream transmitter, the downstream path having a receive clock domain component, a core clock domain component, and a transmit clock domain component; and a downstream bypass path configurable to convey the downlink symbol stream from the upstream receiver to the downstream transmitter without any core clock domain components; and a controller configured to disable a clock signal for the transmit clock domain component of the downstream path when the downstream bypass path is enabled.

20. The nontransient information storage medium of claim 19, wherein the downstream path comprises multiple lanes and wherein the controller is configured to disable a clock signal for all but one of the lanes in the core clock domain component when the downstream bypass path is enabled.

* * * * *